Dec. 11, 1962  F. R. BELL  3,068,372
EDDY-CURRENT BRAKING APPARATUS
Filed Nov. 9, 1959

INVENTOR
FRANCIS R. BELL

BY
ATTORNEYS.

United States Patent Office 3,068,372
Patented Dec. 11, 1962

3,068,372
EDDY-CURRENT BRAKING APPARATUS
Francis Robert Bell, London, England, assignor to The De Havilland Engine Company Limited, Hertfordshire, England, a company of Great Britain
Filed Nov. 9, 1959, Ser. No. 851,873
Claims priority, application Great Britain Nov. 19, 1958
11 Claims. (Cl. 310—93)

This invention relates to eddy-current braking apparatus of the kind including a rotatable braking member capable of rotation relatively to a magnetic field and having an electrically conductive part which, during such rotation, interacts with the magnetic field in such a way that the relative rotation between the braking member and the field is opposed by an electrodynamic braking force exerted upon the electrically conductive part and associated with eddy-currents induced in that part by the magnetic field.

For convenience herein it will be assumed that the magnetic field is stationary and the braking member capable of rotation, but it is to be understood that the opposite arrangement may be used.

It is an object of the invention to provide an eddy-current braking apparatus of the kind referred to for controlling the movement, for example under gravitational or other forces, of a member or members conveniently referred to as a control member, in cases where it is desired that the speed of movement of the control member under the control of the eddy-current braking apparatus shall vary in some predetermined manner during movement of the control member from one position to another, for example throughout its travel in one direction. The control member may be a control rod of a nuclear reactor or atomic pile.

An eddy-current braking apparatus for the above general purpose is known in which the electro-dynamic braking force on the braking member is varied during rotation thereof by a cam mechanism. This introduces the possibility of departures from the designed speed variations due to friction, and it is an object of the present invention to provide an improved eddy-current braking apparatus of the kind referred to which will be both convenient and compact and less liable to error in operation or to seizure.

Eddy-current braking apparatus of the type referred to according to the invention includes a magnetic circuit incorporating a magnet system, the magnetic circuit having at least two relatively movable parts which co-operate to provide the magnetic field relatively to which the rotatable braking member can rotate, and includes control means for causing relative movement of the relatively movable parts to vary in a predetermined manner the magnetic field and thus the electrodynamic braking force exerted upon the braking member when it rotates. The magnetic system is preferably a permanent-magnet system.

Preferably, one of the relatively movable parts comprises the magnet system, and the other relatively movable part, or each of the other relatively movable parts, comprises a flux-carrying structure capable of carrying and controlling magnetic flux deriving from the magnet system.

Conveniently, the relatively movable parts are arranged co-axially and are provided with co-operating pole pieces the variation in electrodynamic braking force being effected by relative rotation of the relatively movable parts about the common axis.

There may be two flux-carrying structures one of which is a flux-carrying member separated from the magnet system by the braking member, and the other of which is a magnetic shunt which is located at that side of the magnet system remote from the braking member.

The two flux-carrying structures may be fixed relatively to one another, in which case variation of the electrodynamic braking force may be effected by the control means by rotation of the magnet system relatively to the flux-carrying structures.

Alternatively, the two flux-carrying structures may be relatively rotatable, in which case variation of the electrodynamic braking force may be effected by the control means by relative rotation between the magnet system and each of the flux-carrying structures, and simultaneous rotation of one flux-carrying structure relatively to the other.

The relative rotation of the relatively rotatable parts of the magnetic system are conveniently effected by the control means in dependence upon the number of revolutions of the rotatable braking member from a datum position.

In the case where the rotatable braking member rotates together with a shaft the rotation of which the braking member controls, the control means may include a gear system by means of which the shaft is arranged to drive the magnet system and/or one of the two flux-carrying structures. The gear system preferably includes a double-epicyclic gear system of which a common sun wheel is rigid with the shaft, and the two planet wheels of each pair mesh with toothed rings respectively on the magnetic system and on one of the flux-carrying structures.

Preferably, the relatively movable parts of the magnetic circuit are substantially of the form of coaxial tubes arranged within one another, in which case the braking member conveniently comprises a cylindrical tube located co-axially between the flux-carrying member and the magnet system, but in an alternative arrangement the relatively movable parts of the magnetic circuit may be substantially of the form of coaxial but axially spaced annuli in which case the braking member may comprise a circular disc or annulus located coaxially between the flux-carrying member and the magnet system.

Conveniently, the braking member is made of soft iron and is copper-plated upon that surface adjacent to the magnet system.

When the magnet system is substantially of the form of a ring or a cylinder, it preferably comprises an even number of arcuate permanent magnets arranged in sequence and each separated from the next adjacent magnets by pole pieces extending towards the braking member, alternate magnets being magnetised in relatively opposite directions.

Similarly where the magnetic shunt is substantially of the form of a ring or a cylinder, it is preferably also provided with a number of pole pieces extending towards the magnet system.

Preferably, in any case the flux-carrying member and/or the magnetic shunt is provided with the same number of pole pieces as is the magnet system. The pole pieces of the magnet system, and/or of the flux-carrying member and/or of the magnetic shunt being equiangularly spaced.

The invention may be performed in a number of ways but one specific embodiment comprising eddy-current braking apparatus for controlling the movement of a control member will now be described with reference to the accompanying drawings in which.

Figure 1:
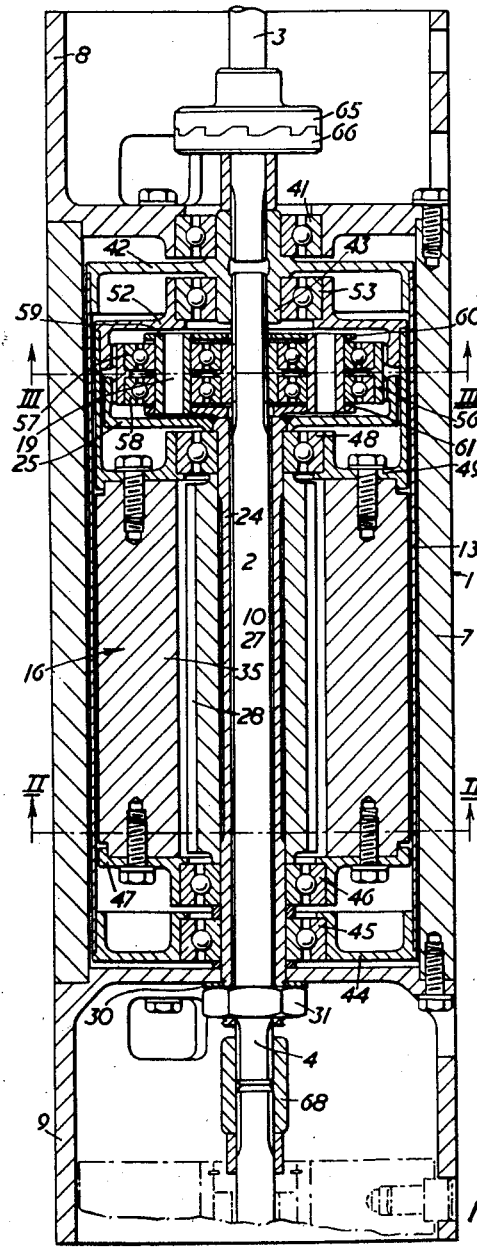
FIGURE 1 is a longitudinal cross-section of the eddy-current braking apparatus.

The eddy-current braking apparatus shown in the drawings referred to comprises a generally cylindrical unit indicated at 1 which is coaxial with and surrounds the driving shaft 2 one end 3 of which is coupled to the electric driving motor (not shown) and the other end 4 of which is coupled to the hoisting drum (not shown).

The unit 1 comprises three principal assemblies mounted coaxially about the driving shaft 2, namely: (i) a stationary assembly comprising essentially a tubular soft-iron outer casing 7 having two flanged end members 8 and 9 secured to its opposite ends, and a central structure indicated generally at 10 which immediately surrounds the driving shaft 2; (ii) an assembly coupled to the driving shaft 2 to rotate with it and including a circular-section eddy-current tube 13, constituting the braking member, which rotates immediately inside the soft-iron outer casing 7, and (iii) a magnet structure indicated generally at 16 which includes four permanent magnets and which is mounted for rotation between the eddy-current tube 13 and the central structure 10.

Figure 3:
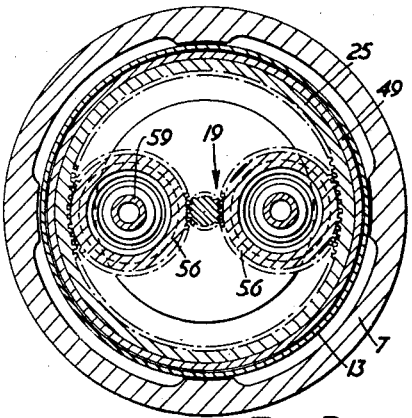
FIGURE 3 is a section taken along the line III—III of FIGURE 1.

The magnet structure 16 is capable of rotating about the axis of the driving shaft 2, and is connected to the driving shaft 2 so as to be driven therefrom by a reduction-gear system indicated generally at 19 in FIGURES 1 and 3, such that during rotation of the driving shaft 2 it has an angular velocity considerably less than that of the driving shaft 2.

Figure 2:
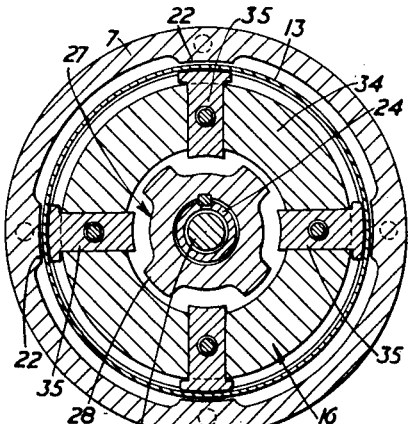
FIGURE 2 is a section taken along the line II—II of FIGURE 1.

The soft-iron outer casing 7 is provided, as shown in FIGURE 2, with four equally spaced pole pieces 22 which extend lengthwise of the inner surface of the outer casing.

The central structure indicated generally at 10 includes a circular-section sleeve 24 which immediately surrounds the driving shaft with a small clearance, and, mounted coaxially with the sleeve 24 and keyed to it, a soft-iron magnetic shunt 27 in the general form of a tube with four longitudinally extending external pole pieces 28 equally spaced around it. To the upper end of the sleeve 24 is secured, by welding, a ring gear 25 in the general form of a flanged disc the peripheral flange of which affords a ring gear to be described later.

As shown in FIGURE 2, the pole pieces 28 of the magnetic shunt 27 are angularly displaced one eighth of a turn (that is to say, 45°) from the pole pieces 22 of the soft-iron outer casing 7.

As may be seen from FIGURE 1, the magnetic shunt 27, the ring gear 25, the inner races of three ball bearings 45, 46 and 48 to be described later, the sleeve 24, and the flange of the flanged end member 9 are clamped together to form a stationary unit by a locking washer 30 and a lock nut 31.

The magnet structure 16 includes four arcuate longitudinally extending permanent magnets 34, which may be made of the material sold under the registered trademark "Alcomax III," separated by four longitudinally extending pole pieces 35 made of soft iron, the permanent magnets 34 being similar to each other, and the pole pieces 35 being similar to each other. The permanent magnets 34 are magnetised circumferentially of the magnet structure 16, and adjacent magnets are magnetised in opposite directions so that adjacent pole pieces 35 are of opposite polarity. As indicated in FIGURE 2, the pole pieces 35 project both from the outer and from the inner surface of the hollow cylinder 16, and are spaced at 90° intervals. Thus, when the hollow cylinder 16 is in the angular position shown in FIGURE 2, the outwardly projecting faces of the pole pieces 35 correspond in angular position with the pole pieces 22 of the outer casing 7, and the inwardly projecting faces of the pole pieces 35 are angularly spaced from the pole pieces 28 of the magnetic shunt 27 by 45°.

Referring to FIGURE 1, and assuming for the purposes of description that the unit is mounted vertically as shown in FIGURE 1, the upper end of the driving shaft 2 is located within the unit 1 by means of a ball-race 41 located centrally within the flange of the flanged end member 8. The ball-race 41 supports a flanged driving disc 42 having a central sleeve 43 the bore of which is serrated to engage with corresponding serrations upon the driving shaft 2 so that the flanged driving disc 42 rotates with the driving shaft 2. The circular-section eddy-current tube 13 is secured at its upper end to the flange of the flanged driving disc 42 so that the eddy-current tube 13 also rotates with the driving shaft 2. The lower end of the eddy-current tube 13 is secured to a flanged ring member 44 which is supported upon the circular-section sleeve 24 of the central structure 10 through a ball-race 45.

Immediately above the ball-race 45 is a further ball-race 46, also mounted upon the sleeve 24, which serves to support the lower end of the magnet structure 16 by way of an end plate 47. The upper end of the magnet structure 16 is similarly supported upon the sleeve 24 by way of a ball-race 48 and a flanged end plate 49. The upper end of the flange of the flanged end plate 49 is secured to a ring gear 52 having a flange which is located upon the central sleeve 43 by way of a ball-race 53.

The reduction gear system 19 includes two planet gears 56 which are located at opposite sides of the driving shaft 2, the driving shaft being provided, as indicated in FIGURE 3, with teeth which engage with the planet gears 56. Each of the planet gears 56 is supported by a pair of ball-races 57 and 58 upon a shaft 59 secured at its upper and lower ends respectively to upper and lower carrier plates 60 and 61 constituting the "spider" of the planetary gear system.

As may be seen from FIGURES 1 and 3, the planet gears 56 engage at their upper parts with the ring gear 52 secured to the magnet structure 16 and at their lower parts with the ring gear 25 secured to the sleeve 24, and the two ring gears 25 and 52 are provided with a slightly different number of teeth so that rotation of the driving shaft 2 causes a corresponding very slow rotation of the ring gear 52 and thus of the magnet structure 16.

In the specific embodiment being described, the driving shaft 2 is provided with eighteen teeth, each of the planet gears 56 is provided with 65 teeth, the stationary ring gear 25 is provided with 148 teeth, and the movable ring gear 52 is provided with 150 teeth. Thus, rotation of the driving shaft 2 causes the spider 59, 60, 61 to rotate about the driving shaft 2 at approximately one tenth of the angular velocity of the driving shaft 2. Each complete revolution of the spider about the driving shaft 2 causes an angular displacement of the movable ring gear 52 corresponding to two teeth of that ring gear with the result that in order to rotate the magnet assembly 16 through one fifth of a revolution, the driving shaft must be rotated through 138.3 revolutions which in the present case corresponds to the complete travel of the control member from its uppermost to its lowest position.

Referring to FIGURE 1, the upper end 3 of the driving shaft 2 which is connected to an electric driving motor (not shown) is connected to the driving shaft 2 proper by means of a clutch of the face-ratchet type having an upper member 65 and a lower member 66. The teeth upon the upper member 65 are arranged with a slight undercut so that they hold firmly in position when drive is applied by the driving motor, but so that the upper member 65 can easily lift if overrun occurs.

The eddy-current tube 13 is made of soft iron, and is copper-plated upon its inner surface. A suitable running clearance of about 0.015" is provided between the eddy-current tube 13 and the pole pieces 22 of the outer casing 7, and a similar clearance is provided between the inner surface of the eddy-current tube 13 and the outwardly projecting faces of the pole pieces 35 of the magnet structure 16. A radial clearance of about 0.005" is provided between the pole pieces 28 of the magnetic shunt 27 and the inwardly projecting faces of the pole pieces 35 of the magnet structure 16.

The lower end 4 of the driving shaft 2 is connected through a splined sleeve 68 to a hoisting and lowering drum (not shown) by which a control member can be raised and lowered, by means of a tape from one end of which the control member is suspended while its other end is connected to the drum in a manner known per se, so that rotation of the drum in one direction or the other winds the tape on or off it to raise or lower the control members.

The operation of this specific embodiment is as follows:

When the magnet structure 16 is in the angular position shown in FIGURE 2, that is, when the outwardly projecting faces of its pole pieces 35 are angularly aligned with the pole pieces 22 of the outer casing 7, the major part of the magnetic flux deriving from the four permanent magnets 35 will pass through the soft-iron outer casing 7 by way of the pole pieces 35 and 22, and only a minor part of the magnetic flux will be shunted away from the path just mentioned by the magnetic shunting action of the magnetic shunt 27. Thus at this stage, the major part of the magnetic flux deriving from the permanent magnets 34 will pass approximately radially through the eddy-current tube 13. For example, 25% of the magnetic flux may be shunted away, while 75% passes through the eddy-current tube. Thus, when the eddy-current tube is rotating with the driving shaft 2 a relatively large electrodynamic braking effect will result which, tending to oppose rotary motion of the eddy-current tube 13, thus also tends to oppose rotation of the driving shaft 2.

As explained above, as the driving shaft 2 rotates the magnet structure 16 including the permanent magnets 34 also is caused to rotate, but much more slowly, and assuming that the magnet structure 16 has rotated from the position shown in FIGURE 2 to a position where its pole pieces 35 are angularly aligned with the pole pieces 28 of the magnetic shunt 27, that is through 45°, it will be clear that the magnetic shunt now produces its maximum shunting effect upon the magnetic flux derived from the permanent magnets 34. Thus in this position the major part of the magnetic flux will be diverted through the magnetic shunt 27 by way of the pole pieces 35 and 28, while only the minor part of the magnetic flux will pass through the eddy-current tube 13 and the soft-iron outer casing 7, and the radial component of the magnetic flux passing through the eddy-current tube 13, and therefore the braking effect, will be at a minimum.

As described, when the driving shaft 2 completes 138.3 revolutions, the magnet structure 16 completes ⅕ of a revolution, that is, the magnet structure moves angularly through 72° relatively to the position shown in FIGURE 2.

As the magnet structure 16 is rotated from the position shown in FIGURE 2 to the final position at which it is inclined by 72° to the position shown in FIGURE 2 the electrodynamic braking effect varies. In fact, the braking effect initially decreases from a maximum value which occurs when the magnet structure 16 is in the angular position shown in FIGURE 2, to a minimum value which occurs when the magnet structure 16 has been rotated through 45° from the position shown in FIGURE 2; thereafter the braking effect increases until the magnet structure 16 reaches its final position where it is inclined at 72° to the position shown in FIGURE 2.

In the specific embodiment being described, the position shown in FIGURE 2 of the magnet structure 16 is that which will be taken up when the control member is fully lowered, and as explained above, the complete travel of the control rod is arranged to correspond to ⅕ of a revolution of the magnet structure 16, that is, to an angular displacement of 72° from a position shown in FIGURE 2. Thus when the control member is fully raised the hollow cylinder 16 will be angularly displaced by 72° from the position shown in FIGURE 2.

Thus, as the control member is lowered from its uppermost position, the magnet structure 16 rotates from this position back to the position shown in FIGURE 2. During this rotation, the electrodynamic braking effect upon the eddy-current tube 13 has at first a value intermediate between the maximum and minimum values. As lowering of the control member continues, the braking effect decreases until, when the hollow cylinder is angularly displaced by 45° from the position shown in FIGURE 2, the braking effect reaches a minimum value. This minimum value is thus reached when the control member has been lowered by about 35% of its travel.

As lowering of the control member continues, the electrodynamic braking effect thereafter increases, at first rapidly, and then less rapidly but more uniformly, until it finally reaches the maximum value when the magnet structure 16 is in the position shown in FIGURE 2.

In the particular application being considered, the control member is normally raised and lowered under the control of the electric driving motor. The eddy-current braking apparatus is intended to control the rate of lowering of the control member under emergency conditions, for example when the electrical supply to the driving motor fails. Under such emergency conditions, it is required that the control member shall automatically return under the force of gravity to its lowermost position in a predetermined controlled manner, under the control of the eddy-current braking apparatus.

Thus, if the electrical supply to the driving motor fails when the control member is in its uppermost position, when the magnet structure 16 is angularly inclined at 72° to the position shown in FIGURE 2, the weight of the control member causes it to drop to its lowest position, thus causing the driving shaft and the driven parts of the driving motor to rotate, and thus the rate of fall of the control member is controlled by the eddy-current braking apparatus in a manner which is predetermined by the arrangement of that apparatus.

It is to be understood that the specific embodiment which has been described is not limited to the specific applications mentioned, but has other applications. Various modifications may also be made in accordance with the invention.

Thus, for example, the magnet structure 16 may be provided with a different number of permanent magnets and corresponding pole pieces. The arrangement described, in which an even number of permanent magnets is provided, the magnets being separated by the same even number of pole pieces, and adjacent magnets having opposite magnetic polarities, is convenient, but other arrangements may be used.

Furthermore, it will be clear that the outer casing 7 need not have the same number of pole pieces as has the magnet structure 16, although it is convenient for balancing purposes to provide the outer casing 7 either with the same number of pole pieces as has the magnet structure 16 or else with a number of pole pieces which is an integral multiple of the number of pole pieces with which the magnet structure 16 is provided. In the latter case, the pole pieces of the outer casing 7 are preferably equispaced. Similarly, the magnetic shunt 27 also need not have the same number of pole pieces as has the magnet structure 16.

It will thus be clear that the unit can be so designed that the electrodynamic braking effect varies in different ways as the magnet structure 16 is rotated relatively to the outer casing 7 of the magnetic shunt 27. Further, in an obvious modification the magnet structure 16 could be held stationary and the previously stationary assembly including the soft-iron outer casing 7 rotated instead.

The magnet structure 16 may be arranged to rotate through any required fraction of a complete revolution, or through more than one revolution, during one complete cycle of any operation to which the brake is to be applied.

It will also be clear that the magnitude of the minimum electrodynamic braking force experienced by the eddy-current tube can be changed by changing the clearance between the pole pieces 28 of the magnetic shunt 27 and the inwardly projecting faces of the pole pieces 35 of the magnet structure 16. Alternatively, or in addition, the magnitude of the maximum electrodynamic braking force experienced by the eddy-current tube may be changed in a similar manner by changing the clearance between the pole pieces 22 of the outer casing 7 and the outwardly projecting faces of the pole pieces 35 of the magnet structure 16.

Furthermore, the phase relationship of the electrodynamic braking effect to the cycle of operations to which that effect is applied can be altered by altering the angular position of the magnet structure 16 at a given stage of the cycle of operations concerned. The magnet structure 16 may, moreover, be arranged to rotate in either direction during the operations concerned.

Again, the reduction-gear system 19 may be replaced by some other suitable gear system to cause the magnet structure 16 to rotate at a required angular velocity relatively to the driving shaft 2.

The widths of the pole pieces of the magnet structure 16, of the outer casing 7, and/or of the magnetic shunt 27, may also be so chosen that a desired electrodynamic braking effect characteristic is obtained.

In a further modification of the specific embodiment, the eddy-current tube 13 is replaced by an electrically conductive rotatable disc which performs a similar function to that of the eddy-current tube 13. For example, a toroidal magnet assembly of generally similar construction to the magnet structure 16 might, in this case, replace that structure, the toroidal magnet assembly being mounted coaxially with the disc and having, in this case, pole pieces similar to the pole pieces 35 but projecting towards and away from one face of the disc. The outer casing 7 could in this case be replaced by a toroidal soft-iron ring mounted at the opposite side of the disc and having pole pieces which project towards the other face of the disc so as to co-operate with the pole pieces of the toroidal magnet assembly. The magnetic shunt can be replaced by a second soft-iron toroidal ring, mounted coaxially with the first and with the disc and the magnet assembly, but located at the side of the magnet assembly distance from the disc, the second toroidal ring being supplied with pole pieces similar to the pole pieces 28 but projecting towards the other face of the disc, that is to say towards the toroidal magnet assembly.

It will further be appreciated that the invention provides a method of and apparatus for varying the electrodynamic braking effect experienced by the electrical conductive moving member, of which the eddy-current tube and the disc described are examples, in a predetermined manner by angular movement of the hollow cylinder 16 including the permanent magnets 34 relatively to the magnetic circuit which includes the outer casing 7 and the magnetic shunt 27 or, in the case of the disc, their equivalents. By causing this relative angular movement to take place during the cycle of the operations to which the braking effect is to be applied, the braking effect can be caused to vary in any required manner during the progress of the operations concerned. It is not necessary that this relative angular movement shall be brought about in accordance with the number of revolutions of a driving shaft which brings about the operation mentioned. The relative angular movement may be brought about in any other suitable manner; for example, the eddy-current tube might be caused to rotate by other suitable mechanism in accordance with the progress of the cycle of operations concerned.

In another modification of the invention, which may be employed to produce a required electrodynamic braking effect which varies in a somewhat different manner, the central structure 10 including the magnetic shunt 27 is not stationary but is rotatable about the axis of the driving shaft 2, relatively to the stationary outer casing 7. The central structure 10 is connected to the driving shaft 2, so as to be driven therefrom, by a second gear system which replaces the locknut 31 and the locking washer 30 and which may be generally of the form of the reduction-gear system 19. Suitable bearings may be provided between the central structure 10, and the driving shaft 2 and/or the outer casing 7. It will be seen that the operation of this modification is generally similar to that of the specific embodiment described with reference to FIGURES 1–3, but with the difference that the angular rotation of the magnetic shunt 27 with the driving shaft 2 causes the electrodynamic braking effect to vary somewhat differently from the manner previously described.

What I claim as my invention and desire to secure by Letters Patent is:

1. Eddy-current braking apparatus including a first flux carrying structure, magnet means positioned for movement relatively to the first flux carrying structure and spaced therefrom, said first flux-carrying structure and said magnet comprising a first magnetic circuit, a second flux-carrying structure spaced from said magnet means and supported in fixed relationship with the first flux-carrying structure, said magnet and said second flux-carrying structure comprising a second magnetic circuit, an eddy-current braking element positioned between said first flux-carrying structure and said magnet means for movement relatively to said magnet means, which braking element cuts the magnetic field in the first magnetic circuit, and control means operatively coupled to cause relative movement between the magnet and said first and second flux-carrying structures upon relative movement occurring between said magnet means and said braking element to vary inversely the reluctances of the first and second magnetic circuit and so vary the strength of the magnetic field cut by the braking element.

2. Eddy-current braking apparatus including first and second fixed flux-carrying structures, movably supported magnet means spaced from each of said flux-carrying structures, said first and second flux-carrying structures together with the magnetic means comprising first and second magnetic circuits respectively, a movably supported eddy-current braking element cutting the magnetic field through the first magnetic circuit in the spacing between said magnet means and said first flux-carrying structure, and control means operatively coupled between said braking element and said magnet means to cause movement of said magnet means on movement of said braking element to vary inversely the reluctances of said first and second magnetic circuits and thereby vary the strength of the magnetic field cut by the braking element.

3. Eddy-current braking apparatus as claimed in claim 2 including magnet means having a number of pole pieces and flux-carrying structures provided with pole pieces cooperating with said pole pieces of said magnet means, wherein the magnet means, the flux-carrying structures and the braking element are positioned about a common axis and are of generally circular cross-section in planes perpendicular to said axis, and wherein said magnet means and said braking element are rotatably supported for angular movement about said axis.

4. Eddy-current braking apparatus as claimed in claim 3 in which the flux-carrying structures, the braking element, and the magnet means are of tubular form and coaxially positioned one within another with the magnet means located between said first and second flux-carrying structures and wherein the braking element comprises a cylindrical tube located coaxially between said first flux-carrying member and said magnet means.

5. Eddy-current braking apparatus as claimed in claim 4 in which the rotary displacement of the magnet means under the control of the control means is dependent upon the rotary displacement of the braking element from a datum position.

6. Eddy-current braking apparatus as claimed in claim 5 wherein the braking element is operably coupled to be driven from a coaxially positioned central, rotatable shaft and wherein the control means includes a gear system by which the shaft is coupled to rotate the magnet means.

7. Eddy-current braking apparatus as claimed in claim 6 in which the gear system includes a double epicyclic gear system which comprises a common sun wheel rigid with the shaft, two ring gears operatively coupled respectively to rotate the magnetic means and one of the flux-carrying structures, and two planet wheels on a common planet carrier between the ring gears and the sun wheel.

8. Eddy-current braking apparatus as claimed in claim 7 in which the braking member is made of soft iron and is copperplated upon that surface adjacent to the magnetic means.

9. Eddy-current apparatus as claimed in claim 3 in which the magnet means comprises an even number of arcuate permanent magnets arranged in sequence and each separated from the next adjacent magnets by a pole piece extending towards the braking member, adjacent magnets being magnetized in opposite directions circumferentially of the magnet means.

10. Eddy-current braking apparatus as claimed in claim 9 in which the pole pieces are equiangularly spaced.

11. Eddy-current braking apparatus comprising a braking member in the form of a hollow drum connected to a shaft to which the electrodynamic braking force is to be applied, a permanent-magnet system including a series of permanent magnets each having pole pieces projecting radially outwards and inwards, such system being of generally annular form and lying concentrically within the drum, and two flux-carrying structures the first of which coaxially surrounds the drum and has pole pieces projecting radially inwards towards the magnet system so that the drum can rotate in the annular space between the magnet system and the said first flux-carrying structure, and the second of which comprises a magnetic shunt mounted coaxially within the magnet system and having radially outwardly projecting pole pieces, the magnet system being connected to the drum through gearing whereby as the drum rotates relatively to the flux-carrying structures the magnet system is rotated at a substantially slower speed relatively to the flux-carrying structures to vary the angular relationship between its pole pieces and the pole pieces of the flux-carrying structures.

References Cited in the file of this patent
UNITED STATES PATENTS

| | | |
|---|---|---|
| 2,361,239 | Ransom | Oct. 24, 1944 |
| 2,503,916 | McIver | Apr. 11, 1950 |
| 2,913,605 | Johnson | Nov. 17, 1959 |